United States Patent [19]
Grochowski et al.

[11] Patent Number: 6,076,153
[45] Date of Patent: Jun. 13, 2000

[54] PROCESSOR PIPELINE INCLUDING PARTIAL REPLAY

[75] Inventors: Edward T. Grochowski, San Jose; Derrick C. Lin, Foster City, both of Calif.

[73] Assignee: Intel Corporation, Santa Clara, Calif.

[21] Appl. No.: 08/998,341

[22] Filed: Dec. 24, 1997

[51] Int. Cl.[7] .................................................. G06F 15/76
[52] U.S. Cl. ............................................. 712/23; 712/219
[58] Field of Search .............................. 712/23, 219, 216

[56] References Cited

U.S. PATENT DOCUMENTS

| | | | |
|---|---|---|---|
| 5,012,403 | 4/1991 | Keller et al. | 712/228 |
| 5,421,022 | 5/1995 | McKeen | 712/23 |
| 5,428,807 | 6/1995 | McKeen | 395/800 |
| 5,659,721 | 8/1997 | Shen | 395/569 |
| 5,751,985 | 5/1998 | Shen et al. | 712/218 |
| 5,764,971 | 6/1998 | Shang et al. | 712/244 |
| 5,765,208 | 6/1998 | Nelson . | |
| 5,784,587 | 7/1998 | Lotz | 395/392 |
| 5,787,474 | 7/1998 | Pflum | 711/138 |
| 5,870,579 | 2/1999 | Tan | 712/218 |
| 5,901,308 | 5/1999 | Cohn | 712/244 |
| 5,987,594 | 11/1999 | Panwar | 712/216 |

*Primary Examiner*—Eric Coleman
*Attorney, Agent, or Firm*—Blakely, Sokoloff, Taylor & Zafman LLP

[57] ABSTRACT

The invention, in one embodiment, is a method for committing the results of at least two speculatively executed instructions to an architectural state in a superscalar processor. The method includes determining which of the speculatively executed instructions encountered a problem in execution, and replaying the instruction that encountered the problem in execution while retaining the results of executing the instruction that did not encounter the problem.

18 Claims, 6 Drawing Sheets

PROCESSOR PIPELINE INCLUDING PARTIAL REPLAY

BACKGROUND OF THE INVENTION

1. Field of the Invention

This invention relates generally to pipelined processors, and more particularly, to a partial replay mechanism for a processor pipeline.

2. Description of the Related Art

Computers and many other types of machines are engineered around a "processor." A processor is an integrated circuit that executes programmed instructions stored in the machine's memory. There are many types of processors and there are several ways to categorize them. For instance, one may categorize processors by their intended application, such as microprocessors, digital signal processors ("DSPs"), or controllers. One may also categorize processors by the complexity of their instruction sets, such as reduced instruction set computing ("RISC") processors and complex instruction set computing ("CISC") processors. The operational characteristics on which these categorizations are based define a processor and are collectively referred to as the processor's architecture. More particularly, an architecture is a specification defining the interface between the processor's hardware and the processor's software.

One aspect of a processor's architecture is whether it executes instructions sequentially or out of order. Historically, processors executed one instruction at a time in a sequence. A program written in a high level language was compiled into object code consisting of many individual instructions for handling data. The instructions might tell the processor to load or store certain data from memory, to move data from one location to another, or any one of a number of data manipulations. The instructions would be fetched from memory, decoded, and executed in the sequence in which they were stored. This is known as the "sequential programming model." Out of order execution involves executing instructions in some order different from the order in which they are presented by the program, i.e., out of order or non-sequentially.

The sequential programming model creates what are known as "data dependencies" and "control dependencies." For instance, if one uses the variable x to calculate a result, one needs to know the value of x and that value might depend on results from previously executed instructions. Similarly, a group of instructions might contain two alternative subsets of instructions, only one of which will be executed, depending on some specified condition. Thus, the result of executing the group of instructions will depend on whether a branch is executed. Even out of order execution follows this sequential programming model, and it therefore also creates data and control dependencies.

A second aspect of a processor's architecture is whether it "pipelines" instructions. The processor fetches instructions from memory and feeds them into one end of the pipeline. The pipeline is made of several "stages," each stage performing some function necessary or desirable to process instructions before passing the instruction to the next stage. For instance, one stage might fetch an instruction, the next stage might decode the fetched instruction, and the next stage might execute the decoded instruction. Each stage of the pipeline typically moves the instruction closer to completion.

Some processor pipelines process selected instructions "speculatively." Exemplary speculative execution techniques include, but are not limited to, advanced loads, branch prediction, and predicate prediction. Speculative execution means that instructions are fetched and executed before resolving pertinent control dependencies. Speculative execution requires a prediction as to what instructions are needed depending on whether a branch is taken, executing fetched instructions, and then verifying the execution and prediction. The pipeline executes a series of instructions and, in the course of doing so, makes certain predictions about how control dependencies will be resolved. For instance, if two instructions are to be alternatively executed depending on the value of some quantity, then the pipeline has to guess what that value will be or which instruction will be executed. The pipeline then predicts the next instruction to be executed and fetches the predicted instruction before the previous instruction is actually executed.

A pipeline therefore has the tremendous advantage that, while one part of the pipeline is working on a first instruction, a second part of the pipeline can be working on a second instruction. Thus, more than one instruction can be processed at a time, thereby increasing the rate at which instructions can be executed in a given time period. This, in turn, increases the processor throughput.

Verification is one of the pipeline's most significant challenges. At the end of the pipeline, the results from executed instructions are temporarily stored in a buffer until all their data and control dependencies have been actually resolved. The pipeline then checks to see whether any problems occurred. If there are no problems, then the executed instructions are "retired." This is sometimes referred to as "commitment to an architectural state" or "retirement to a committed state." Retirement or commitment signals that all dependencies have been correctly resolved and that the execution results are finalized.

However, no pipeline correctly predicts all eventualities and, when problems occur, they must be repaired. Problems can typically be traced to:

(1) executing an instruction that should not have been executed;

(2) omitting an instruction that should have been executed; or (3) executing an instruction with incorrect data.

The effects of such problems on subsequent execution of instructions must also be repaired. Once the problem and its effects have been repaired, the pipeline can then process the execution stream correctly.

Most pipelined processors "stall" the pipeline upon detecting a problem. As discussed above, the pipeline is usually divided into several stages. Progress through the stages is governed by a number of latches enabled by a signal generated by a particular part of the pipeline. If a problem is detected, the latches are disabled and the pipeline "stalls" such that the instructions can no longer be transferred into the next stage. The problem and its effects are then repaired, the latches are re-enabled, and the pipeline resumes.

Design considerations now counsel against stall pipelines in some circumstances. A stall pipeline must receive signals from different parts of the pipeline, determine whether the pipeline must stall, and then broadcast the appropriate signal to enable or stall pipeline progression. This determination takes a certain amount of time. New generations of processors are now operating at frequencies that make that amount of time a significant design constraint.

Some processor pipelines "replay" in addition to stalling. Replay is the re-execution of instructions upon detecting an execution problem in the retirement of speculative results. The speculative results are not retired, i.e., used to update the architectural state of the processor, but are instead ignored. The pipeline corrects the problem and then re-executes the instructions. The new results are then checked for problems and retired.

One such processor is the Alpha 21164 microprocessor, commercially available from Digital Equipment Corporation. The Alpha 21164 stalls only the first three stages of the pipeline. If a problem occurs after the third stage, the Alpha 21164 replays the entire pipeline beginning with the repaired problem instead of stalling the problem in midstream. However, replaying the entire pipeline regardless of the problem can be expensive in terms of time. The Alpha 21164 therefore combines expensive stalling with complex decision-making circuitry necessary to determine when to replay. Also, when the Alpha 21164 replays, it replays the entire pipeline line even though the problem may be localized at some point in the pipeline.

The demand for faster, more powerful processors continually outstrips present technology. The demand pressures all aspects of processor architecture design to become faster, which demand directly implicates pipeline throughput. Thus, there is a need for a new technique for correcting execution problems in a pipelined process.

The present invention is directed to overcoming, or at least reducing the effects of, one or more of the problems set forth above.

SUMMARY OF THE INVENTION

The invention, in one embodiment, is a method for committing the results of at least two speculatively executed instructions to an architectural state in a superscalar processor. The method includes determining which of the speculatively executed instructions encountered a problem in execution, and replaying the instruction that encountered the problem in execution while retaining the results of executing the instruction that did not encounter the problem.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
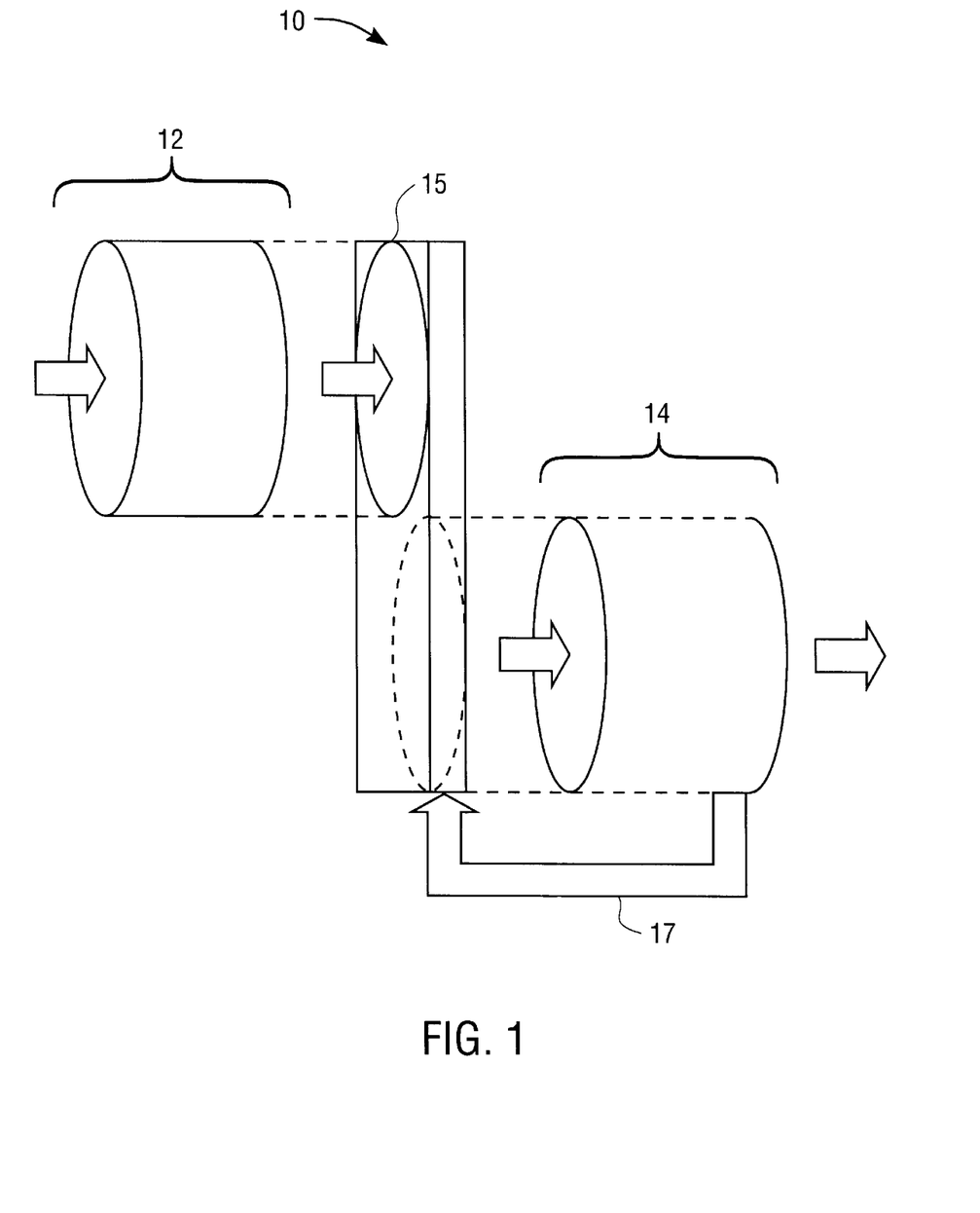
FIG. 1 conceptually illustrates an embodiment of a pipeline constructed and operating according to the present invention.

FIG. 1 conceptually illustrates in an exploded view one particular embodiment of a processor pipeline 10 constructed and operated in accordance with the present invention. The pipeline 10 generally comprises a front end 12, a back end 14, and a queue 15 between the front end 12 and the back end 14. The queue 15 is capable of storing an intermediate state of the processor (not shown) from which the back end 14 may be replayed per a request transmitted over a channel 17 as set forth below.

In some embodiments, the queue 15 may be considered a part of the back end 14 rather than separate from the back end 14. However, for the sake of clarity and to further this disclosure of the invention claimed below, the queue 15 and the back end 14 shall be discussed as separate parts of the pipeline 10. Nevertheless, the invention is not so limited as the back end 14 may incorporate the queue 15 in some alternative embodiments.

The front end 12 fetches instructions, generates "micro-ops" therefrom, and prepares the micro-ops for execution. A micro-op is generally a single transaction that may be executed by a single execution unit (not shown) of the processor in a single clock cycle. An instruction is typically a single a micro-op. However, in some embodiments, some more complicated instructions might comprise three or more micro-ops. Thus, there is not necessarily a one-to-one correspondence between instructions and micro-ops.

The front end 12 in the embodiment illustrated generates micro-ops from the instructions and enters them into the queue 15 for execution. The generation of micro-ops from instructions may also be referred to as "expanding" or "decoding" the instructions. The back end 14 executes the instructions as prepared by the front end 12 and stored in the queue 15.

The queue 15 is functionally positioned between the front end 12 and the back end 14. The front end 12 enters instructions in the form of micro-ops into the queue 15. The queued micro-ops define an intermediate state of the machine from which the back end 14 of the pipeline 10 can be replayed as discussed more fully below.

Figure 2A:
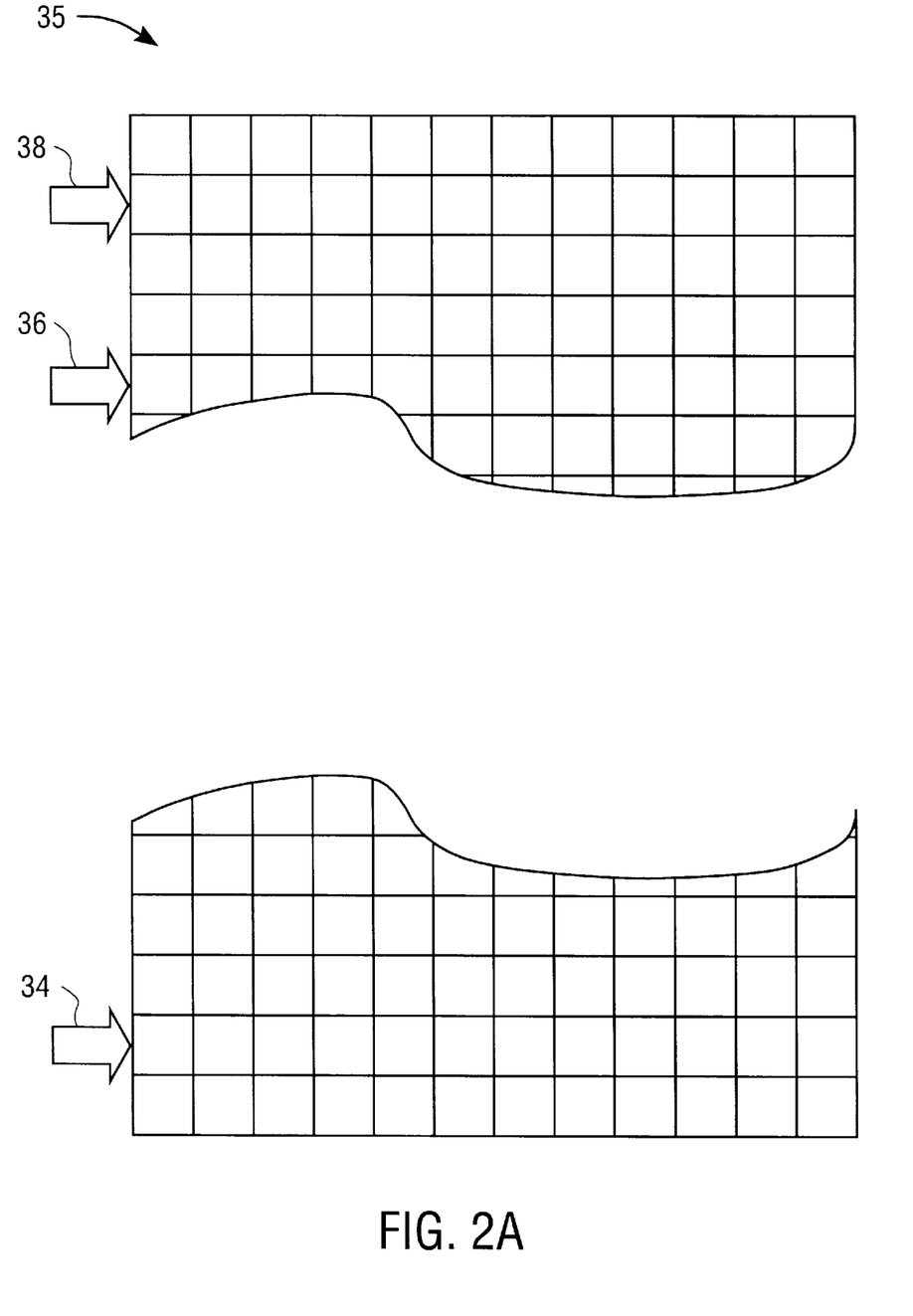
FIG. 2A depicts a first embodiment of a queue between the front and back ends of the pipeline illustrated in FIG. 1.

FIG. 2A illustrates one particular embodiment 35 of the queue 15 in FIG. 1. The queue 35 must be sufficiently wide to feed the resources of the back end 14. For instance, in one particular embodiment, the pipeline 10 includes N arithmetic logic units ("ALUs") executing instructions in parallel and the queue 35 for that particular embodiment is N columns wide. This particular embodiment is also superscalar, and so it is sufficiently wide to provide micro-ops to the N ALUs at every clock cycle.

Although the queue 35 includes one column per ALU, this structure is not necessary to the practice of the invention and other suitable structures may be employed. For instance, some embodiments might choose to implement N queues 35, each being one ALU wide. The queue 35 is a master queue in the sense that it queues the micro-ops for each arithmetic logic unit ("ALU") in the processor.

The queue 35 is also sufficiently long that it can store the micro-ops generated for each unretired instruction in the back end 14. The micro-ops are not deallocated from the queue 35 until the instructions from which they are generated are retired. Thus, the queue 35 stores the intermediate state of the pipeline 10. The state is "intermediate" in that it represents the instructions in a state subsequent to their initial state, i.e., unexecuted, and prior to their final state, i.e., retired. In the event a problem is detected in retirement, the back end 14 can be replayed from the intermediate state stored in the queue 35 without having to replay the entire pipeline 10.

The queue 35 in this particular embodiment includes a head pointer 34. a tail pointer 36, and a replay pointer 38. The head pointer 34 points to the "head" of the queue 35 where new micro-ops are entered into the queue 35. The tail pointer 36 points to the next row of micro-ops to enter the back end 14 of the pipeline 10 for execution. The replay pointer 38 points to the first row of micro-ops in the replay when a replay is requested. The replay pointer 38 is set to the oldest, unretired micro-op in the queue 35. To initiate a back end replay, the pipeline 10 copies the replay pointer 38 into the tail pointer 36. The copy repositions the tail pointer 36 to the oldest unretired micro-op in the queue 35 such that it becomes the next micro-op read out of the queue 35.

Each of the pointers 34, 36, and 38 is modulo incremented so that they wraparound to form a circular queue. As new micro-ops are written to the queue 35, the head pointer 34 is incremented. Similarly, as micro-ops are read from the queue 35, the tail pointer 36 is incremented. Finally, as each micro-op is retired, the replay pointer 38 is incremented. Old, retired micro-ops are written over as the pointers 34, 36, and 38 are incremented so that old entries of retired micro-ops in the queue 35 are reused. When one of the pointers 34, 36, or 38 reaches the last entry in the queue 35 and is then advanced, it wraps around to the first entry in the queue 35. The tail pointer 36 typically trails the head pointer 34 and the replay pointer 38 trails the tail pointer 36 as shown in FIG. 2A, although this is not necessarily the case as is discussed immediately below.

The queue 35 is empty when the head pointer 34 equals the tail pointer 36. The queue 35 in this particular embodiment always reserves one empty row for detecting a full queue condition. Thus, when the head pointer 34 is one less than the replay pointer 38, the queue 35 is full. In one particular embodiment, the full pipeline 10 is replayed when the queue 35 becomes full. Alternative embodiments might instead append an extra bit to each of the head pointer 34 and the tail pointer 38. If the head pointer 34 and the replay pointer 38 are equal, and if the appended bits are different, then the queue 35 is full. If the head pointer 34 and the replay pointer 38 are equal, and if the appended bits are the same, then the queue 35 is empty.

Figure 2B:
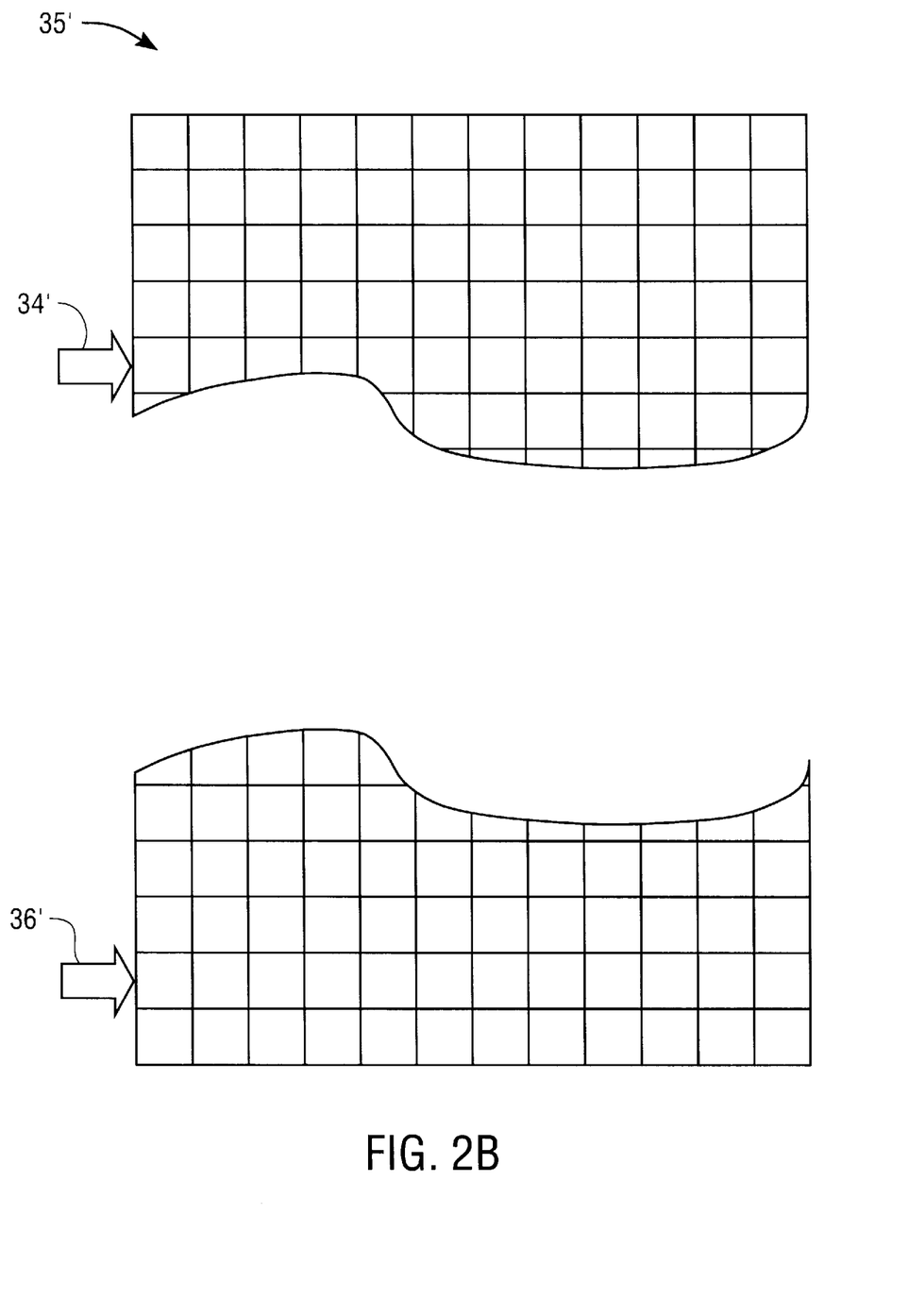
FIG. 2B depicts a second embodiment of a queue between the front and back ends of the pipeline illustrated in FIG. 1.

FIG. 2B illustrates a second embodiment 35' of the queue 15 in FIG. 1. The queue 35' is implemented with a shift register and uses only two pointers. The queue 35' physically shifts data down as micro-ops are retired. The oldest, unretired micro-op is therefore always at the bottom of the shift register, thereby effectively fixing the replay pointer 38 in the embodiment of FIG. 2A. Otherwise, the embodiment 35' of FIG. 2B functions similarly to the embodiment 35 of FIG. 2A.

Figure 3:
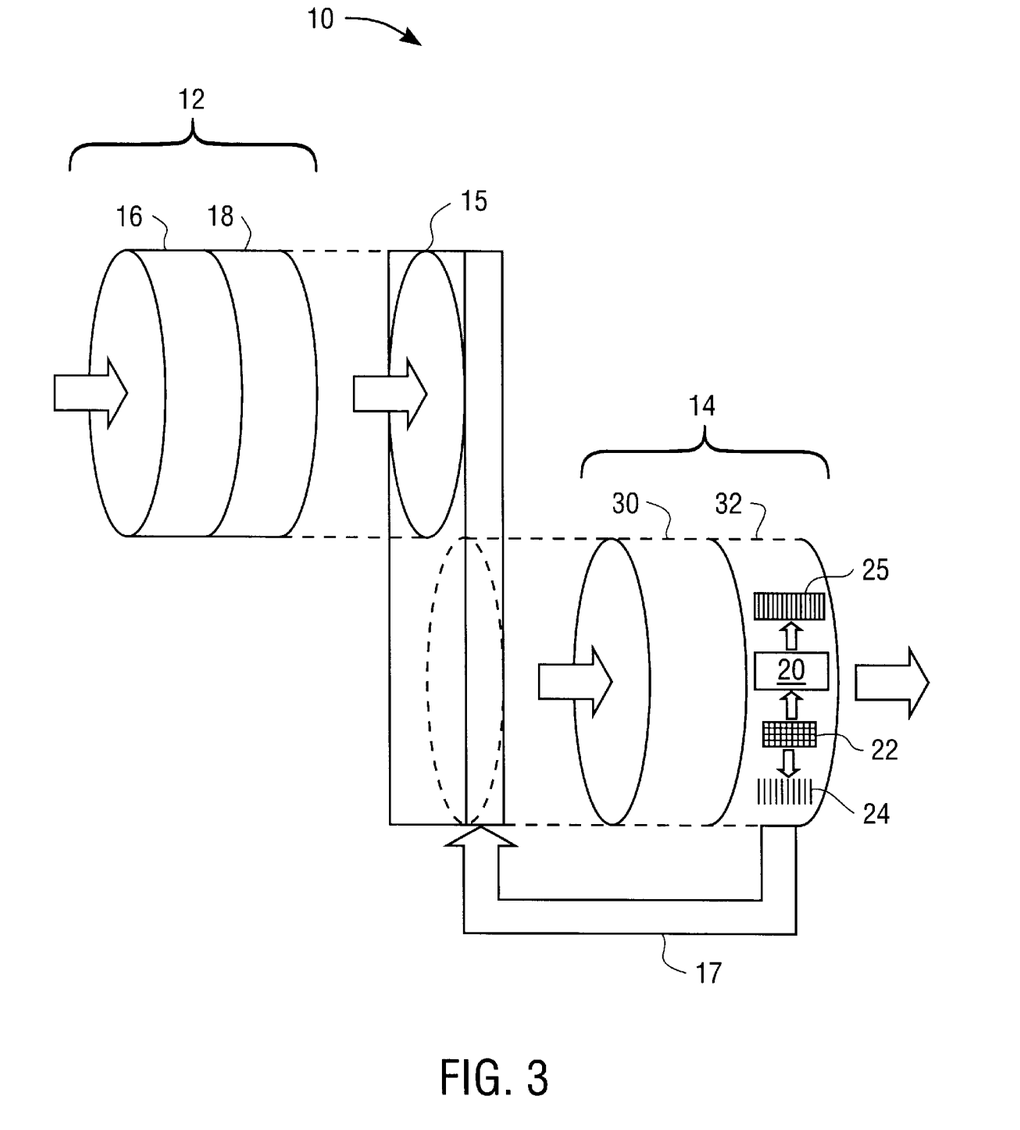
FIG. 3 conceptually illustrates one particular variation on the pipeline of FIG. 1.

Turning now to FIG. 3, the front end 12 and the back end 14 generally include one or more "stages" of processing. The front end 12 may be of any suitable design known to the art. "Suitable" in this context means that the particular front end 12 fetches instructions from memory, expands them into micro-ops, and enters them into the queue 15 for execution by the back end 14. Other features may be desirable in various alternative embodiments depending on the particular implementation. However, a front end 12 will generally include at least a fetch stage 16 and an expand, or decode, stage 18.

The back end 14 of the embodiment illustrated in FIG. 1, as shown in FIG. 3, also includes several stages of processing. As with the front end 12, many alternative embodiments may be implemented and particular features may be desirable depending on the particular implementation. However, the back end 14 will generally include an execution stage 30 and a retirement stage 32. The back end 14 reads the instructions from the queue 15, executes the micro-ops, and retires executed instructions. Execution problems are checked for and detected in the retirement stage.

The stages 16, 18, 30, and 32 of the pipeline 10 above are merely representative and are neither exclusive nor exhaustive of stages that might be present in various alternative embodiments. Further, as those in the art will appreciate, the demarcation of stages and functions in a processor pipeline are not necessarily so crisp or distinct as might appear from FIG. 3. The pipeline 10 in FIG. 1 is conceptualized for the sake of clarity in explaining the present invention. Thus, the precise structure of the front end 12 and the back end 14 in terms of stages is not pertinent to the practice of the invention.

The retirement stage 32 includes a set of retirement logic 20, a mask 25, a speculative register file 22, and an architectural register file 24. As the instructions are executed, the results are temporarily buffered in the speculative register file 22 before retirement to the architectural register file 24. The retirement logic 20 checks whether any problems occurred in the execution of the instructions whose results are buffered in the speculative register file 22. As the retirement logic 20 checks the speculative results in the speculative register file 22, its sets the mask 25 to indicate which instructions encountered problems and need to be replayed.

The retirement logic 20 maintains the mask 12 to indicate which instructions encountered problems in execution and which did not. The mask 12 includes a series of 1s and 0s indicating which instructions being checked contain a problem and need to be replayed. In an embodiment having a queue 15 N ALUs wide, the mask includes N 1s and 0s, one for each ALU. The mask is an index, or key, back into the queue 15 identifying the point in the execution stream where the problem occurred. The retirement logic (not shown) transmits the mask and the replay request to the queue 15. The tail pointer of the queue 15 is then repositioned as discussed above and the replay commences according to the mask, which is merged by the queue 15 with the queued micro-ops.

Returning to FIG. 1, progress through the pipeline 10 is controlled by flip-flops (not shown) and/or staged domino circuits (also not shown). In the embodiment of FIG. 1, the flip-flops and/or staged domino circuits are free running as the pipeline 10 does not stall. Instead of stalling when a problem is detected, the pipeline 10 is either flushed or drained and a replay is instituted.

Returning to FIG. 1, the micro-ops generated from the instructions are entered into the queue 15, e.g., the queue 35 of FIG. 3A, as described above and enter the back end 14 from the queue 15. The back end 14 processes the micro-ops and makes predictions to resolve data and control dependencies when necessary. The micro-ops are processed on the assumption that all predictions correctly resolve the underlying dependencies. Once the queued micro-ops are executed, they are temporarily stored to await commitment to an architectural state.

As mentioned earlier, committing the instructions to the architectural state includes checking for problems in execution. Problem checking may be performed in any suitable manner known to the art. As will be appreciated by those in the art, some amount of problem checking is implementation specific. The precise manner in which problems are checked is not material to the present invention. If a problem is detected, the uncommitted execution results are squashed, or ignored. The pipeline 10 is then flushed or drained, i.e., the pipeline 10 is either reset or all instructions in the back end 14 are allowed to complete execution and the buffers are reset.

Many types of problems may be detected. Exemplary problems in one particular embodiment include:

(1) a cache miss;

(2) a branch or predicate misprediction;

(3) an exception, such as a page fault or an illegal instruction;

(4) a translation look-aside buffer ("TLB") miss; and (5) certain data dependencies, such as loadstore conflicts.

In one particular embodiment, back end replay is, as a general rule, instituted as a result of memory access problems. However, the invention is not so limited. Also, some problems may not result in back end replay. These problems may be handled in other ways in some embodiments. These variations are all implementation specific.

Once a problem is detected, the problem and its effects must be repaired. Again, the repair will be implementation specific depending on, among other things, the nature of the problem. For instance, if the problem is:

(a) a predicate misprediction, the correct predicate must be inserted for the replay; or (b) a load store conflict, the store must be completed, the cache updated, and then the correct value loaded.

Problem repair can be quickly performed because the queue 15 has stored the intermediate state of the pipeline 10. Thus, the problem can be identified and corrected in the queue 15 and the execution stream replayed. The effects of the problem will then necessarily be corrected in the replay.

In accord with the present invention, the back end 14 is replayed from the queued micro-ops, i.e., the stored intermediate state, if a problem is detected. The pipeline 10 is either flushed or drained and the uncommitted results squashed. The pipeline 10 then requests a replay over the channel 17. Assuming the queue 15 is implemented using the embodiment of FIG. 2A, the pipeline copies the replay pointer 38 into the tail pointer 36. Execution of the queued micro-ops then commences as described above.

The results of the re-execution are temporarily buffered and checked for problems. Although the problem necessitating the replay should not reoccur, other problems might arise. If a new problem is detected, then a replay is once again requested as set forth above. The pipeline 10 will eventually produce a problem-free set of uncommitted results that can then be retired. Since the original problem should not reoccur, each iteration of the back end 14 progresses toward retirement of the instructions from which the micro-ops were generated. Techniques for predicting control and data dependencies are sophisticated and sufficiently accurate that replay is the exception rather than the rule.

Figure 4:
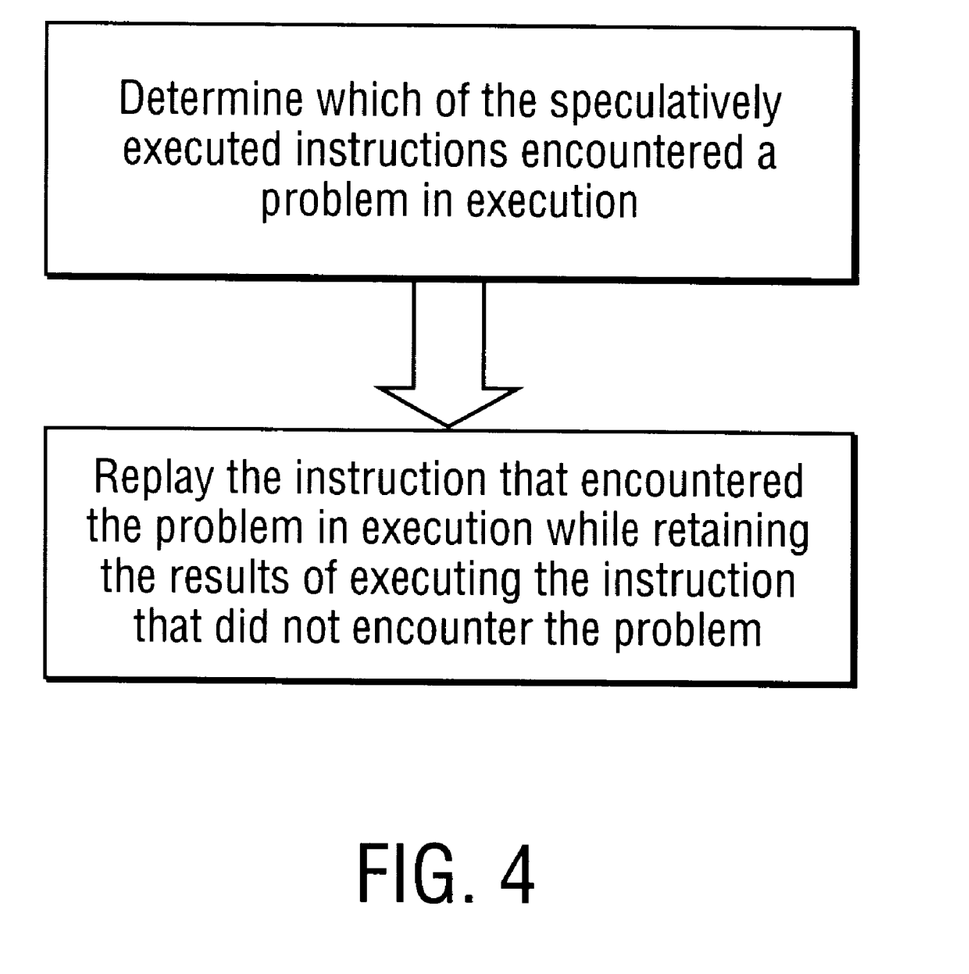
FIG. 4 illustrates an embodiment of a method for committing the results of speculatively executed instructions to an architectural state according to the present invention.

FIG. 4 presents one embodiment of a method for committing the results of at least two speculatively executed instructions to an architectural state in a superscalar processor employing a pipeline such as the pipeline 10 of FIGS. 1 and 2. The method comprises first determining which of the speculatively executed instructions encountered a problem in execution. Second, replaying the instruction that encountered the problem in execution while retaining the results of executing the instruction that did not encounter the problem.

The method of FIG. 4 is susceptible to variation. The results of the instructions that were executed without problem may be retained, in various alternative embodiments, by committing the results to an architectural state or by holding them in the speculative registers 22. In the latter case, the contents of the speculative registers 22 are committed to an architectural state when each of the at least two instructions has been correctly executed.

In one particular embodiment of the method in FIG. 4, determining which of the speculatively executed instructions encountered the problem includes at least three separate acts. First, the retirement logic 20 checks for whether any of the instructions encountered a problem in execution. Second, the retirement logic 20 indicates which of the speculatively executed instructions encountered the problem in execution. Last, the retirement logic 20 transmits the indication to a predetermined point in a pipeline of the processor for replay.

Typically, in this particular embodiment, the indication is the mask 25. Further, replaying the instruction that encountered the problem in execution generally includes replaying a back end 14 of the pipeline 10. In the pipeline 10 of FIG. 2, the pipeline 10 includes a micro-op queue 15, and the predetermined point to which the indication is transmitted is the micro-op queue 15.

Figure 5:
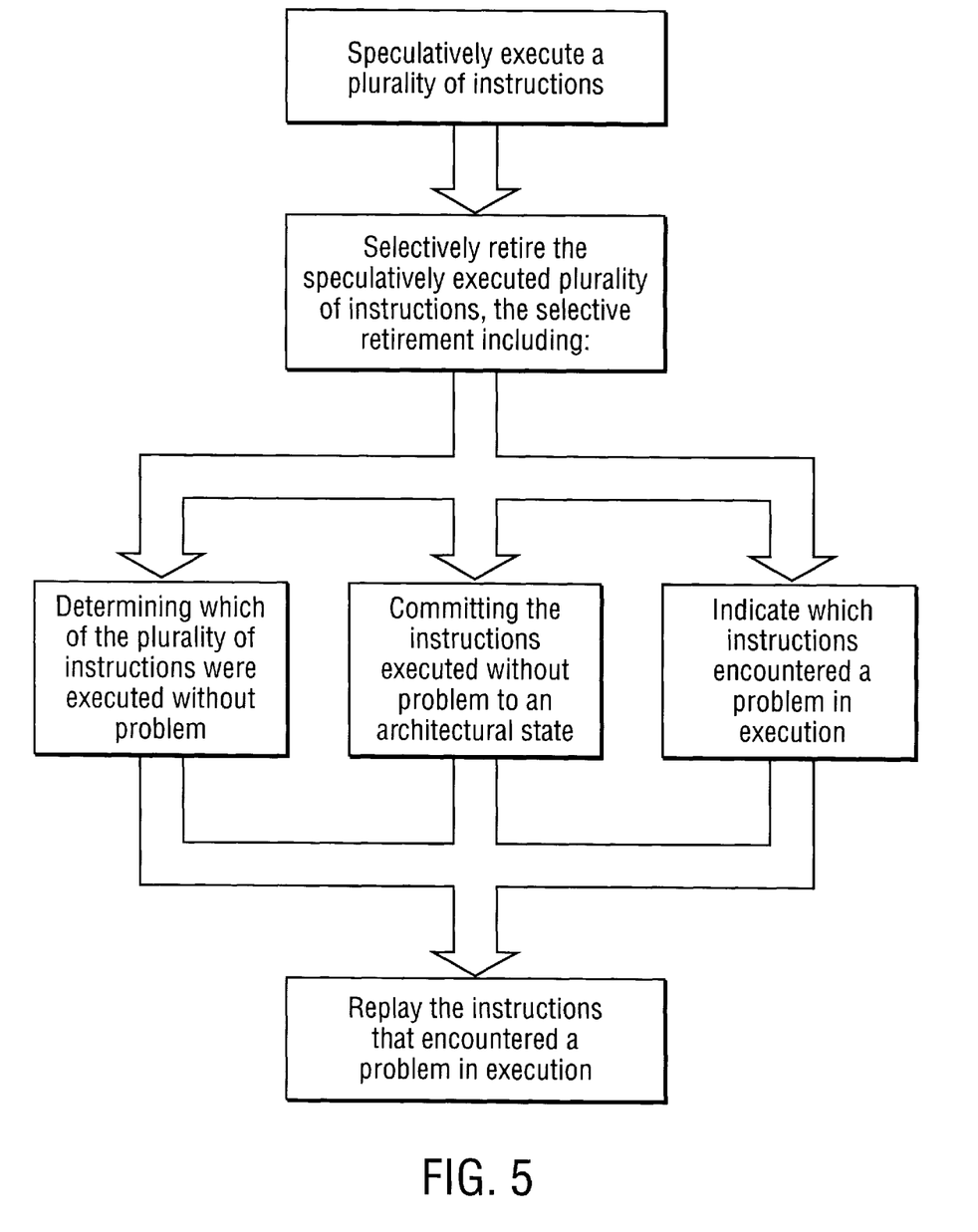
FIG. 5 illustrates an embodiment of a method for processing in a processor in accord with the present invention.

The method of FIG. 4 may also be practiced as part of a larger method for executing instructions in a processor pipeline as is shown in FIG. 5. The method generally begins by speculatively executing a plurality of instructions. Next, the pipeline selectively retires the speculatively executed plurality of instructions. This selective retirement includes determining which of the plurality of instructions were executed without problem, committing the results of instructions executed without problem to an architectural state, and indicating which instructions encountered a problem in execution. Finally, the instructions that encountered a problem in execution are replayed.

As with the method of FIG. 4, the method of FIG. 5 is susceptible to variation. For instance, speculatively executing the plurality of instructions may include queuing the instructions in the pipeline and the instructions may be queued when they are decoded. Also, replaying the instructions that encountered the problem in execution includes replaying a back end of a pipeline for the processor, although other variations of replay might be used. Indicating which of the speculatively executed instructions encountered a problem in execution generally includes transmitting the indication to a predetermined point in a pipeline of the processor for replay. The indication is usually the mask 25. In the pipeline 10 of FIG. 2, the micro-op queue 15 may be the predetermined point to which the indication is transmitted.

Thus, the present invention increases the time-efficiency of a pipeline by replaying the back end 14 rather than stalling or replaying the entire pipeline 10. Correcting problems by stalling the pipeline 10 might cost twenty clock cycles whereas back end replay as described above might cost as few as ten cycles. The practice of the invention might therefore reduce the amount of time spent correcting problems by half in some circumstances.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of replaying a speculatively executed instruction comprising:

queuing instructions, which include speculative instructions, in a pipeline queue;

determining which of the speculative instructions encountered a problem in execution;

allowing for partial replay by allowing certain instructions in the pipeline queue to complete; and replaying the instruction that encountered the problem in execution from the pipeline queue without reloading the pipeline queue, while retiring an instruction in the queue that did not encounter the problem.

2. The method of claim 1, wherein the retiring the instruction that did not encounter the problem includes committing a non-speculative result to an architectural state.

3. The method of claim 2, further including the storing of a speculative result in a register for a speculative instruction which cannot be retired.

4. The method of claim 3, wherein said determining which of the speculative instructions encountered the problem includes identifying a point in the pipeline where replay is to commence.

5. The method of claim 4, wherein said queuing speculative instructions includes queuing micro-ops of those instructions.

6. A method of processing instructions in a processor comprising:

queuing instructions, which include speculative instructions, in a pipeline queue of the processor;

determining which of the speculative instructions encountered a problem in execution;

allowing for partial replay by allowing certain instructions in the pipeline queue to complete, and replaying the instruction that encountered the problem in execution from the pipeline queue without reloading the pipeline queue, while retiring an instruction in the queue that did not encounter the problem.

7. The method of claim 6 further including the fetching and decoding of the instructions prior to queuing the instructions.

8. The method of claim 6 further including the storing of a speculative result in a register for a speculative instruction which cannot be retired and the retiring the instruction includes committing a non-speculative result to an architectural state.

9. The method of claim 8, wherein said determining which of the speculative instructions encountered the problem includes identifying a point in the pipeline where replay is to commence.

10. The method of claim 9, wherein said queuing speculative instructions includes queuing micro-ops of those instructions.

11. A processor pipeline comprising:

a front end for receiving instructions for the pipeline;

a back end for executing the instructions; a queue coupled between the front end and the back end for queuing instructions, including speculative instructions, which are to be executed and in which a speculative instruction encountering a problem is identified; and a loop coupled to said queue and said back end for replaying the instruction that encountered the problem in execution without reloading instructions in said queue, while retiring an instruction that did not encounter the problem.

12. The processor pipeline of claim 11, wherein said loop replays instructions in said back end.

13. The processor pipeline of claim 12, wherein said back end further includes a mask to indicate the instruction that encountered the problem in execution.

14. The processor pipeline of claim 11, wherein said queue is part of said back end.

15. The processor pipeline of claim 11, wherein the queue queues micro-ops associated with the instructions.

16. The processor pipeline of claim 11, wherein said front end includes a fetch stage and a decode stage.

17. The processor pipeline of claim 11, wherein the back end includes a retirement stage.

18. The processor pipeline of claim 15, further including a tail pointer to identify a location of a next micro-op to enter the back end and a replay pointer to identify a location of an executed, but unretired micro-op, said loop for having a content of the replay pointer placed in the tail pointer when requesting a replay.

* * * * *